United States Patent
Kubota

(10) Patent No.: US 7,411,706 B2
(45) Date of Patent: Aug. 12, 2008

(54) ORIGINAL FEEDING APPARATUS AND IMAGE READING APPARATUS

(75) Inventor: Ichitaro Kubota, Enzan (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 1091 days.

(21) Appl. No.: 10/705,825

(22) Filed: Nov. 13, 2003

(65) Prior Publication Data

US 2004/0130759 A1 Jul. 8, 2004

(30) Foreign Application Priority Data

Nov. 22, 2002 (JP) ............................. 2002-339933

(51) Int. Cl.
H04N 1/04 (2006.01)
B65H 29/00 (2006.01)
B65H 5/22 (2006.01)

(52) U.S. Cl. ...................... 358/498; 271/3.15; 271/280

(58) Field of Classification Search ................ 271/3.01, 271/3.02, 3.15, 3.17, 280, 282; 358/474, 358/486, 487, 488, 496, 498, 497

See application file for complete search history.

(56) References Cited

U.S. PATENT DOCUMENTS

| 4,300,169 | A | * | 11/1981 | Sato ............................ 358/488 |
|---|---|---|---|---|
| 4,774,591 | A | * | 9/1988 | Matsunawa et al. ......... 358/444 |
| 5,102,116 | A | * | 4/1992 | Garavuso ..................... 271/121 |
| 5,765,824 | A | * | 6/1998 | Kawano et al. .......... 270/58.11 |
| 6,540,222 | B2 | * | 4/2003 | Araki et al. ................. 271/122 |
| 7,142,335 | B2 | * | 11/2006 | Tesavis ....................... 358/474 |
| 2002/0020957 | A1 | * | 2/2002 | Araki et al. .............. 271/10.11 |
| 2002/0101625 | A1 | * | 8/2002 | Shouji ........................ 358/474 |
| 2005/0035523 | A1 | * | 2/2005 | Triplett et al. .............. 271/3.14 |

FOREIGN PATENT DOCUMENTS

| JP | 62115147 | * | 5/1987 |
|---|---|---|---|
| JP | 63123036 | * | 5/1988 |

* cited by examiner

Primary Examiner—Jerome Grant, II
(74) Attorney, Agent, or Firm—Manabu Kanesaka

(57) ABSTRACT

An original feeding apparatus includes a sheet feeding tray for stacking an original; a feeding device for feeding the original stacked on the sheet feeding tray one at a time; a transport roller for receiving the original from the feeding means at a predetermined nipping position and transporting the original along an outer surface of the roller; a drive device for driving the transport roller; and a detection device for detecting that a predetermined fixed position on the outer surface of the transport roller matches the nipping position. The transport roller can be controlled such that the transport roller receives a leading edge of the original fed from the feeding means at the fixed position, i.e. an original transport starting position.

11 Claims, 7 Drawing Sheets

ORIGINAL FEEDING APPARATUS AND IMAGE READING APPARATUS

BACKGROUND OF THE INVENTION AND RELATED ART STATEMENT

The present invention relates to an original feeding apparatus and an image reading apparatus provided with the original feeding apparatus. The image reading apparatus of the invention can be used for a device such as a copier, printer, facsimile machine or scanner.

An original feeding apparatus feeds an original or sheet stacked on an original feeding tray (original tray) one at a time to an original reading unit to read an image on the original. After the original reading unit reads the original, the original is discharged to a discharge tray.

In recent years, there has been increased a demand for an automatic document feeding apparatus with high quality reading performance. In such an automatic document feeding apparatus, a transport roller for transporting the original is required to transport the original linearly (without bending) relative to a transport direction without any variation. The demand for such transport performance has been increased in proportion to image quality.

FIGS. 7(A) to 7(C) are sectional views of a conventional original feeding apparatus with a large roller 131 (transport roller). Arrows shown in FIGS. 7(A) to 7(C) indicate positions on the original where the large roller 131 nips the original (position where an outer circumference of the large roller 131 contacts the original). As shown in FIGS. 7(A) to 7(C), in the conventional apparatus, the large roller 131 nips the original at various positions, at which the large roller 131 starts transporting the original. The conventional original feeding apparatus does not control the roller to contact the original at a constant position on the outer circumference thereof for reading the original.

FIG. 7(A) shows a nipping position of the large roller 131 on the original when nipping a first original. FIG. 7(B) shows a nipping position of the large roller 131 on the original when nipping a second original. FIG. 7(C) shows the nipping position of the large roller 131 on the original when nipping a third original. The nipping positions (contact positions of the outer circumference) of the large roller 131 for the respective originals vary and are inconsistent. Depending on when the large roller 131 starts rotating, the outer circumference of the large roller 131 contacts the original at a different position.

When a plurality of the originals is read consecutively, it is necessary to reduce variation due to eccentricity of the roller and to transport the originals in a constant manner (such as a constant transport speed and a constant feed amount). To this end, it has been tried to minimize the variation of the roller associated with rotation to improve precision of the transport roller. Specifically, it has been tried to improve circularity of the transport roller and the roller shaft, or prevent vibration of the roller caused by the rotation to increase the precision.

In the conventional original feeding apparatus described above, the large roller does not nip the original at a constant position (position of contact on the outer circumference) when the large roller starts transporting the original. In this case, when the roller does not have sufficient precision, the following problems may occur as the roller contacts the originals at different positions. For example, the original may be transported at a different speed. When one side of the roller has a transporting force different from that on the other side thereof in a direction perpendicular to the transport direction, it is possible to cause a variation in image alignment (such as a leading edge position, a side position and skew) for each original. Therefore, it is necessary to use a part with high precision to reduce the variation.

In order to improve the precision of the transport roller, it is necessary to implement advanced technology in a manufacturing process and quality control. For example, it may be necessary to add a process of polishing the outer surface of the roller after a process of molding the outer surface of the roller. The additional process increases the amount of work, thereby reducing the productivity of the part, increasing difficulty in the quality control, and increasing a cost of the part. Also, it is difficult to control the quality of a large quantity when the part has high precision.

In view of the problems described above, the present invention has been made, and the first object of the present invention is to provide an original feeding apparatus and an image reading apparatus in which an original is transported and read stably without using a part with high precision to reduce a variation when a plurality of the originals is processed continuously.

The second object of the present invention is to provide an original feeding apparatus and an image reading apparatus in which an operator can select a high quality mode for producing a high quality image and a non-high quality mode for reading the original at a high speed.

Further objects and advantages of the invention will be apparent from the following description of the invention.

SUMMARY OF THE INVENTION

In order to attain the objects described above, according to the present invention, an original feeding apparatus includes a sheet feeding tray for stacking an original; feeding means for feeding the original stacked on the sheet feeding tray one at a time; a transport roller for receiving the original from the feeding means at a predetermined nipping position and transporting the original while an outer surface of the roller contacts the original; drive means for driving the transport roller; and detection means for detecting that a predetermined position on the outer surface of the transport roller matches the nipping position. In the original feeding apparatus, the transport roller is controlled such that the transport roller receives a leading edge of the original fed from the feeding means at the predetermined position, i.e. an original transport starting position.

In the present invention, the transport roller transports the original to a reading position from the constant predetermined position on the outer surface of the transport roller, i.e. the original transport starting position. Accordingly, it is possible to reduce variation in the original transport performance when a plurality of the originals is read continuously. In the present invention, the original transport starting position is located at a constant position on the outer surface of the roller, so that the original is transported stably, thereby obtaining stable image quality without using a part with high precision.

According to the present invention, an original reading apparatus includes a sheet feeding tray for stacking an original; feeding means for feeding the original stacked on the sheet feeding tray one at a time; a transport roller for receiving the original from the feeding means at a predetermined nipping position and transporting the original while an outer surface of the roller contacts the original; reading means for reading an image on the original fed by the transport roller at a predetermined reading position; drive means for driving the transport roller; detection means for detecting that a predetermined position on the outer surface of the transport roller matches the nipping position; and reading mode setting means for selecting a high quality mode and a non-high quality mode. In the original reading apparatus, when the high quality mode is selected, the transport roller is controlled such that the transport roller receives a leading edge of the original fed from the feeding means at the predetermined position, i.e. an original transport starting position.

DETAILED DESCRIPTION OF PREFERRED EMBODIMENTS

Figure 1:
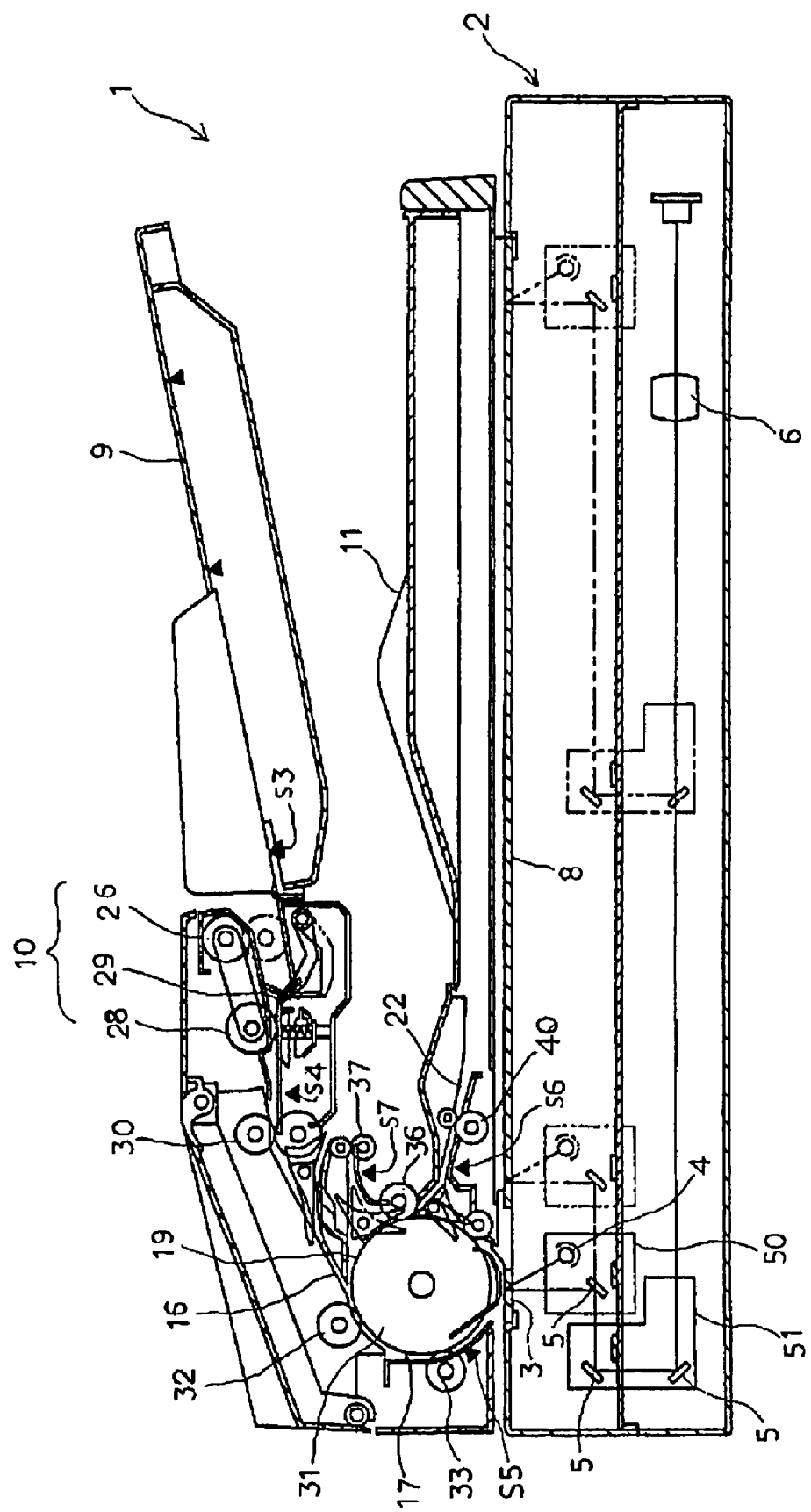
FIG. 1 is a plan view of an original feeding apparatus mounted on an image reading apparatus according to the present invention.
Figure 2:
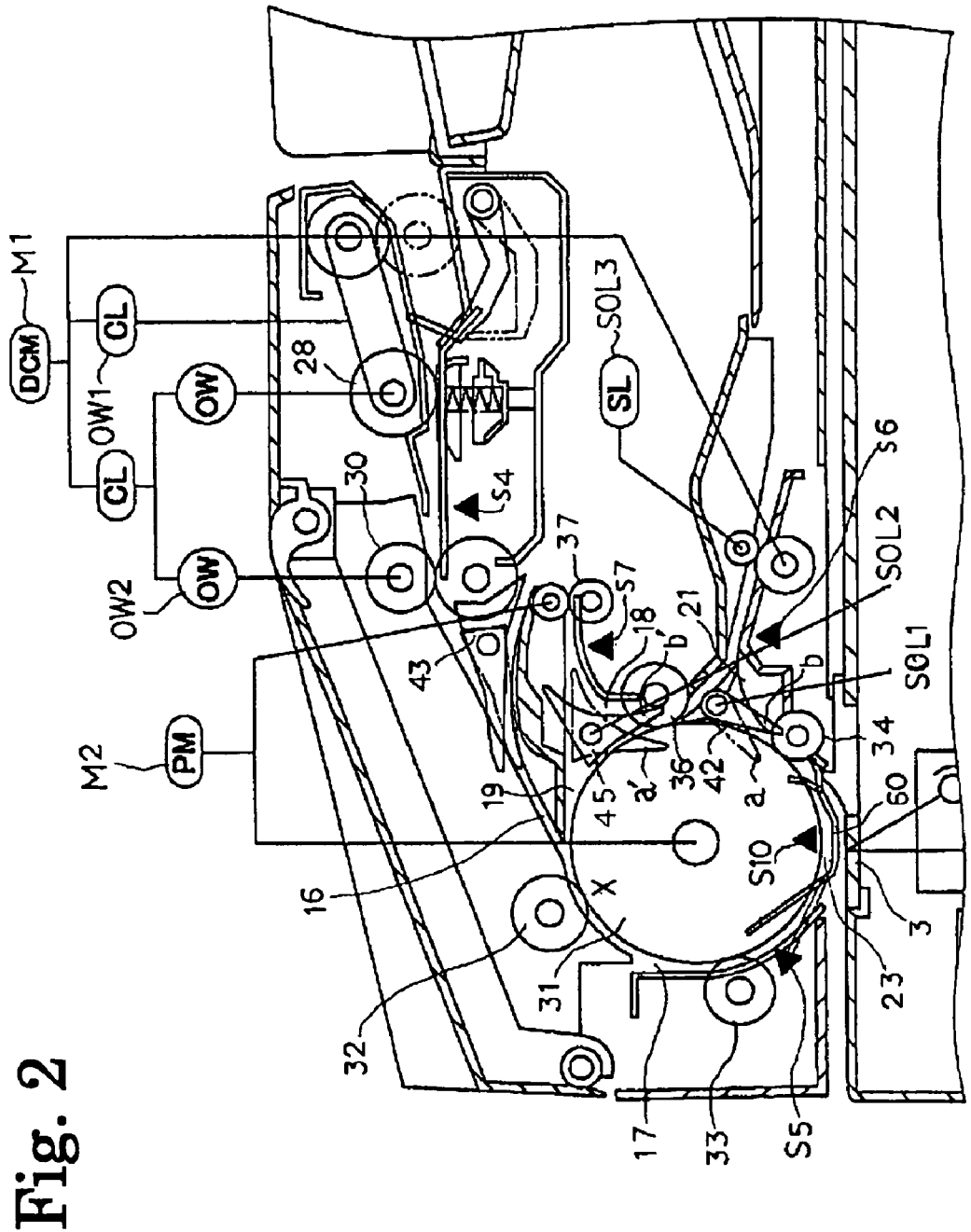
FIG. 2 is an enlarged view of an original transport mechanism of the original feeding apparatus shown in FIG. 1.

Hereunder, preferred embodiments of the present invention will be described in detail with reference to the accompanying drawings. FIG. 1 is a sectional view of an automatic document feeder 1 (hereinafter referred to as ADF) and a reading device 2 is an image reading apparatus according to the present invention. As shown in FIG. 1, the image reading apparatus is provided with the ADF 1 and the reading device 2. FIG. 2 is a sectional view of an original transport mechanism of the ADF 1.

The ADF 1 is mounted on the reading device 2 to transport an original or sheet to pass over a top surface of the first platen 3 in the reading device 2. In the reading device 2, a light source 4 such as a lamp irradiates light on the original through the first platen 3. Mirrors 5 reflect the light to form an image on a condenser lens 6, and an image sensor (reading means) such as a charged couple device (CCD) reads the image on the original.

The first platen 3 has a reading position (reading unit) of the reading device 2, and the reading device 2 is provided with a second platen 8 having a surface area large enough for placing an entire surface of the original. In the reading device 2, when an operator opens the ADF 1 and places a thick original such as a book on the second platen 8, it is also possible to move the first carriage 50 having the light source 4 and the mirrors 5, and the second carriage 51 in a sub-scanning direction to read an image on the original through the second platen 8.

The ADF 1 is equipped with an original tray 9 for stacking a plurality of the originals, supply means 10 for supplying the original stacked on the original tray 9 one at a time to the reading position, and a discharge tray 11 for storing the original discharged from the reading position. The ADF 1 also includes a paper feed path 16 for feeding the original stacked on the original tray 9 one at a time toward the reading position on the first platen 3, a transport path 17 extending from the paper feed path 16 for guiding the original along the first platen 3, and a discharge path 18 extending from the transport path 17 to a discharge outlet of the discharge tray 11.

The ADF 1 also includes a circulating path 19 extending from the discharge outlet of the discharge tray 11 to a connecting portion of the paper feed path 16 and the transport path 17 for returning the original to the transport path 17, an intermediate path 21 branching from the discharge path 18 for guiding the original from the transport path 17, and a switchback path 22 for switching back the original from the intermediate path 21 to transport the original in a reverse direction.

In a duplex reading mode for reading images on both sides of the original, a pair of switchback rollers 40 rotates in reverse to switchback a transport direction of the original from front to back while nipping a trailing edge of the original, and transports the original to the reading position of the first platen 3 via the circulating path 19.

As described above, the original feeding apparatus according to the invention has a function of returning the original to the predetermined reading position. When the original is returned to the reading position, the original is transported to the reading position after being transported in the discharge direction, or the original is switched back toward the upstream direction opposite to the discharge direction and is transported to the reading position.

In the sheet feed path 16, there are arranged a feed roller 26 for feeding the original, a transport roller 28 for transporting the original fed by the feed roller 26, a separation member 29 for allowing the transport roller 28 to transport only the uppermost single original and for preventing the second and subsequent originals from being fed, and a pair of register rollers 30 for transporting the original from the transport roller 28 toward a further downstream side after aligning the leading edge thereof.

The feed roller 26 and the transport roller 28 are connected to a feed motor M1 via a one-way clutch OW1. The register rollers 30 are connected to the feed motor M1 via a one-way clutch OW2. With this configuration, the feed motor M1 rotates the feed roller 26 and the transport roller 28 in a forward rotation thereof and rotates the register rollers 30 in a reverse rotation thereof.

In the transport path 17, there are arranged a large transport roller 31 and a plurality of follower rollers 32, 33 and 34 pressed against an outer circumference of the transport roller 31. The transport roller 31 is driven forward and in reverse by the transport motor M2. The transport roller 31 is provided with a home position sensor S10 (detection means) for detecting that a starting position X (hereinafter referred to as a home position X) on the outer surface of the transport roller 31 where the transport roller 31 starts transporting the original is located at a predetermined original nipping position.

A pair of discharge rollers 37 for discharging the original to the discharge tray 11 and a follower roller 36 pressed against the transport roller 31 are arranged in the discharge path 18. The discharge rollers 37 are connected to the transport motor M2 capable of rotating forwardly and reversely. The switchback path 22 is arranged below the discharge path 18.

A solenoid SOL3 is provided for separating one of the switchback rollers 40 from the other. Accordingly, when the original is circulated via the circulating path 19 and the transport path 17, it is possible to transport the original without hindrance when the leading edge of the original crosses the trailing edge thereof. The switchback rollers 40 are connected to the feed motor M1 capable of rotating forwardly and reversely.

A backup guide member 60 is disposed above the first platen 3 at a downstream side of the transport path 17. The backup guide member 60 is provided for regulating a transport gap of the transport path 17 for accurate reading of the image on the original.

A switchback flapper 42 is disposed at a downstream side in the transport path 17 for guiding the original to one of the discharge path 18 and the switchback path 22. A switchback solenoid SOL1 is provided for driving the switchback flapper 42. The switchback flapper 42 is located at a position a shown in FIG. 2 for guiding the original to the switchback path 22, and is located at a position b shown in FIG. 2 for guiding the original to the discharge path 18.

A discharge flapper 45 is disposed at a downstream side of the switchback flapper 42 for guiding the original to one of the circulating path 19 and the discharge roller 37. The switchback solenoid SOL1 drives the discharge flapper 45. The discharge flapper 45 is located at a position a' shown in FIG. 2 for guiding the original to the discharge roller 37, and is located at a position b' shown in FIG. 2 for guiding the original to the circulating path 19. A free flapper 43 is arranged above the discharge path 18 and moves downwardly when the trailing edge of the original passes thereby.

The discharge rollers 37 are connected to the transport motor M2 capable of rotating forwardly and reversely. In the duplex reading mode for reading the images on both sides of the original, the pair of the discharge rollers 37 rotates in reverse to switchback the transport direction of the original from front to back while nipping the trailing edge of the original, and transports the original to the transport path 17 via the circulating path 19.

A pressing solenoid (not shown) is provided for separating one of the discharge rollers 37 from the other. Accordingly, when the original is circulated via the circulating path 19 and the transport path 17, it is possible to transport the original without hindrance when the leading edge of the original crosses the trailing edge thereof.

Figure 3:
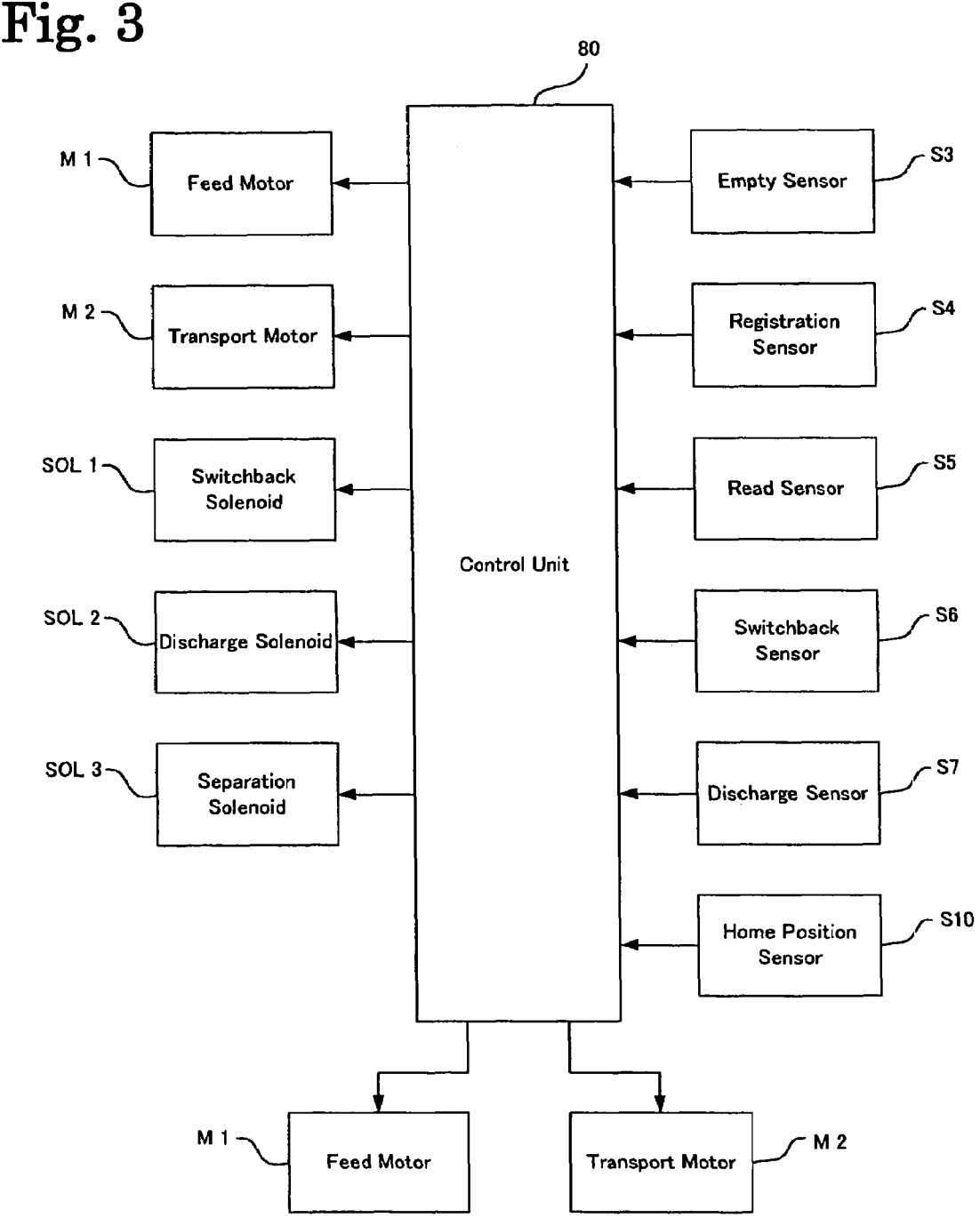
FIG. 3 is a block diagram of a control configuration for controlling transport of the original.

FIG. 3 is a block diagram of a transport control device 80 for controlling the transport of the original. An empty sensor S3 is disposed on the original tray 9 for detecting the original thereupon. A register sensor S4 is disposed in the paper feed path 16. A read sensor S5 is arranged in the transport path 17. A switchback sensor S6 is arranged in the switchback path 22. A discharge sensor S7 is arranged in the discharge path 18. A home position sensor S10 is arranged at the transport roller 31.

The sensors S3 to S10 are connected to the transport control device 80 (control means). The feed motor M1 and the transport motor M2 are connected to the transport control device 80. The switchback solenoid SOL1, the discharge solenoid SOL2 and the separation solenoid SOL3 are connected to the transport control device 80. The transport control device 80 comprises a central processing unit (or CPU) to control the transport of the original. The transport control device 80 controls the motors M1 and M2 and the solenoids SOL1 to SOL3 for performing the operation of transporting the original based on a signal output from the sensors of S1 to S10.

According to the embodiment of the present invention, the image reading apparatus comprises an image signal control device (not shown) for receiving an output signal from red, green and blue line sensors reading the image on the original. The image signal control device determines that the image is in color when there is a difference in the output signals from the sensors, and determines that the image is in black and white when there is no difference.

According to the embodiment of the present invention, the image reading apparatus determines whether the original is in color or in black and white, and reads the color image in the high quality mode and reads the black and white image in the non-high quality mode. It is also possible to select the reading mode through an image quality selection switch (not shown).

Accordingly, when an operator wants to read the black and white original in the high quality mode, it is possible to select the high quality mode to read the black and white original through the image quality selection switch.

Figure 4A:
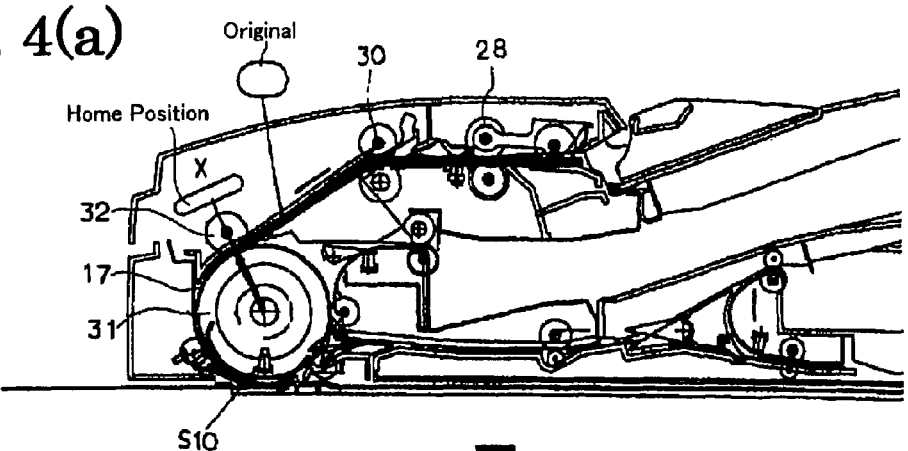
FIGS. 4(a)-4(c) are sectional views of the original feeding apparatus for explaining a process of transporting the original by a transport roller.
Figure 4B:
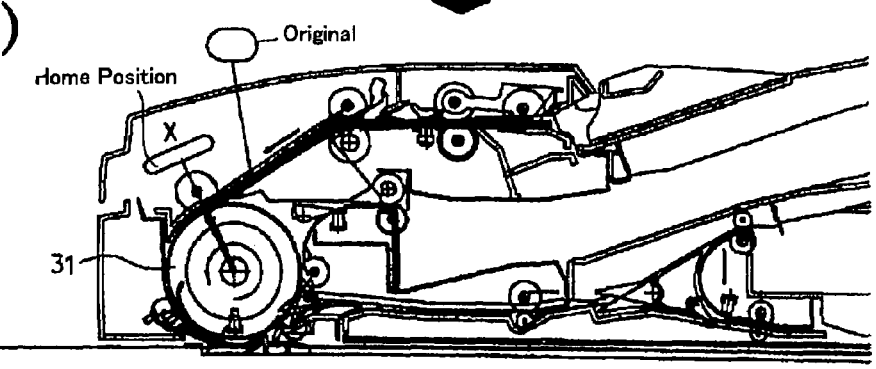
Figure 4C:
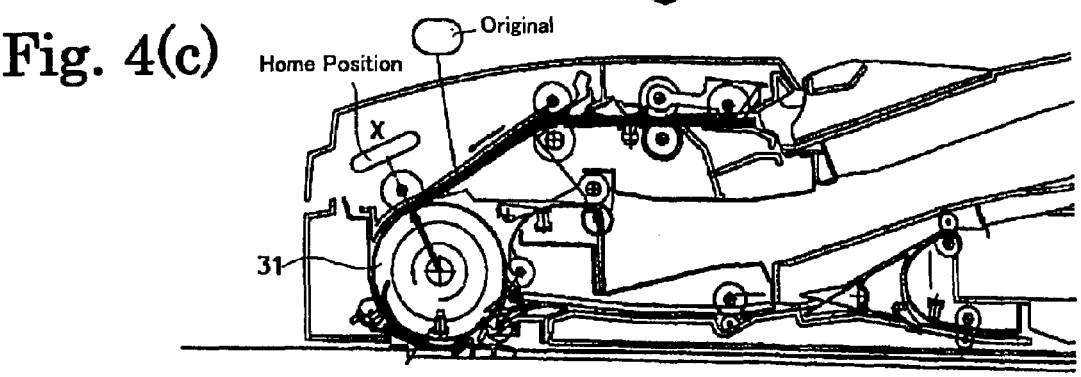

A configuration and an operation of the transport roller 31 in the ADF 1 for detecting the home position will be explained next. FIGS. 4(a)-4(c) are sectional views of the ADF 1 for explaining the transport operation of the transport roller 31 in the ADF 1.

In the embodiment, the home position sensor S10 is disposed on the transport roller 31 for positioning the home position X (position for starting the transport operation) on the outer surface of the transport roller 31 at a constant position when the original is transported in the high quality mode (color image reading mode). The home position sensor S10 is formed of, for example, a slit plate and a photo-interrupter (position display member).

The home position sensor S10 is arranged so that the home position X on the transport roller 31 is located at a predetermined position (position where the transport roller 31 and the follower roller 32 start nipping the original) when the position display member is detected (for example, when light from the position display member is detected). The home position sensor S10 sends a home position detection signal to the control device 80 when the home position X on the transport roller 31 reaches the predetermined position.

The control device 80 drives the feed motor M1 to rotate in reverse to drive the register rollers 30, thereby transporting the original to the predetermined position between the transport roller 31 and the follower roller 32.

The original transported from the register rollers 30 abuts against the nipping position between the follower roller 32 and the transport roller 31. Then, the transport motor M2 starts rotating forward to transport the original to the transport path 17 while contacting the outer surface of the transport roller 31.

FIG. 4(a) shows the ADF 1 in which the transport roller 31 and the follower roller 32 nip the first original at the nipping position (starting position of the transport operation indicated by the arrow in the drawing) where the home position X of the transport roller 31 contacts a surface of the follower roller 32. In FIG. 4(b), after the first original is transported, the transport roller 31 rotates and nips the second original at the nipping position (indicated by the arrow in the drawing). In FIG. 4(c), after the second original is transported, the transport roller 31 rotates and nips the third original at the nipping position (indicated by the arrow in the drawing).

As shown in FIGS. 4(a), 4(b) and 4(c), the home position X on the transport roller 31 is detected through the home position sensor S10, so that the transport roller 31 always nips the original at the home position X on the transport roller 31. Accordingly, the transport roller 31 nips the original at the same position on the outer surface thereof for each original, and the transport roller 31 nips the original at the same contacting surface thereof for each original. Therefore, it is possible to transport the original uniformly for each original, thereby reducing a variation (in a transport speed and alignment) and obtaining the high quality image.

When the original is transported with the same transport characteristic, it is possible to correct a position, a shift and a color of the image on the original in the same process, thereby obtaining the high quality image in the final output and making it easy to read the original as opposed to the apparatus in which the original is transported with a different transport characteristic for each original. When the high quality image is not necessary (for example, in the case of the black and white original), the transport roller 31 transports the original from an arbitrary position on the outer surface thereof so that the original is read at a speed higher than that in the high quality mode.

Figure 5:
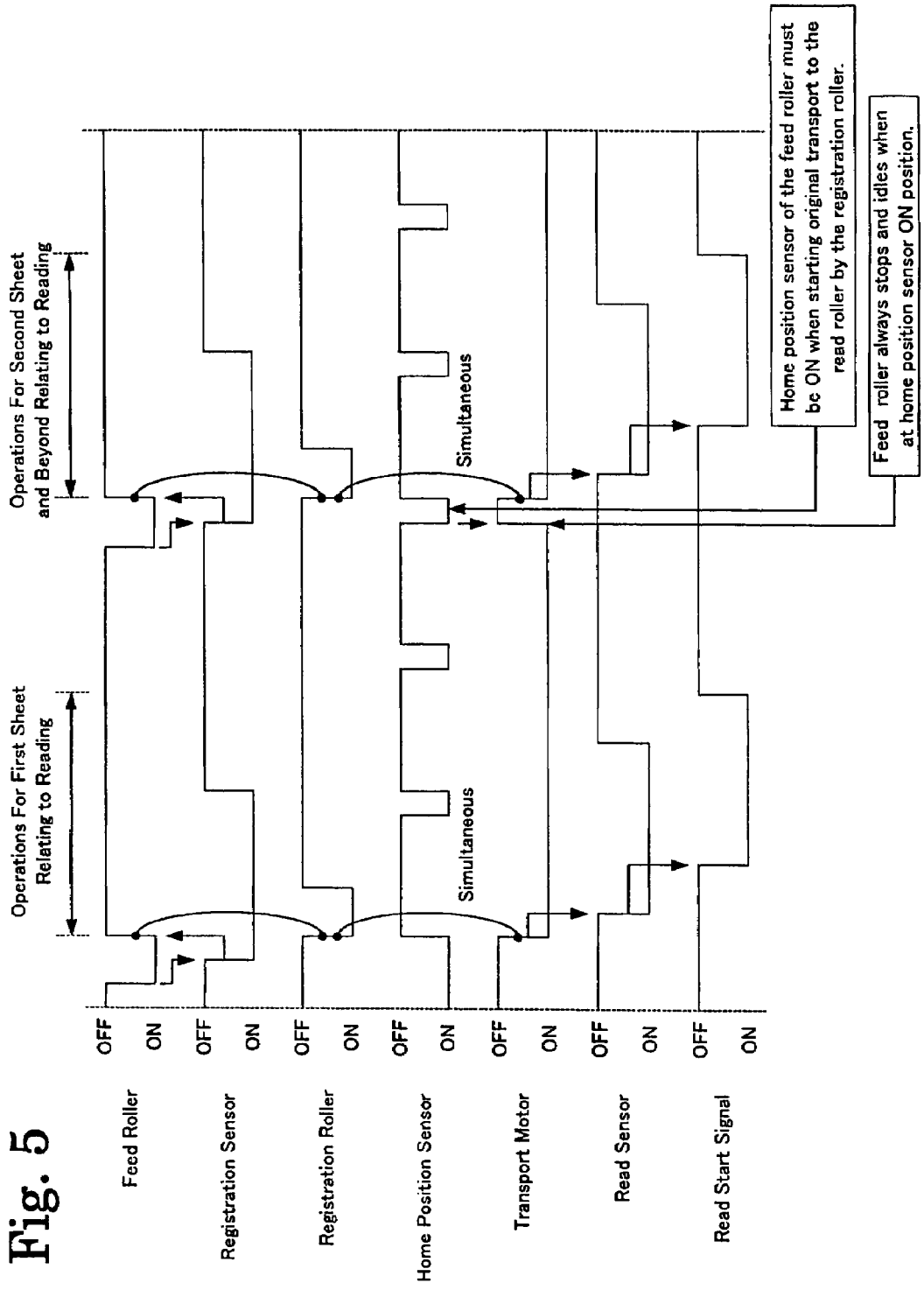
FIG. 5 is a timing chart of transporting the original according to the present invention.
Figure 6:
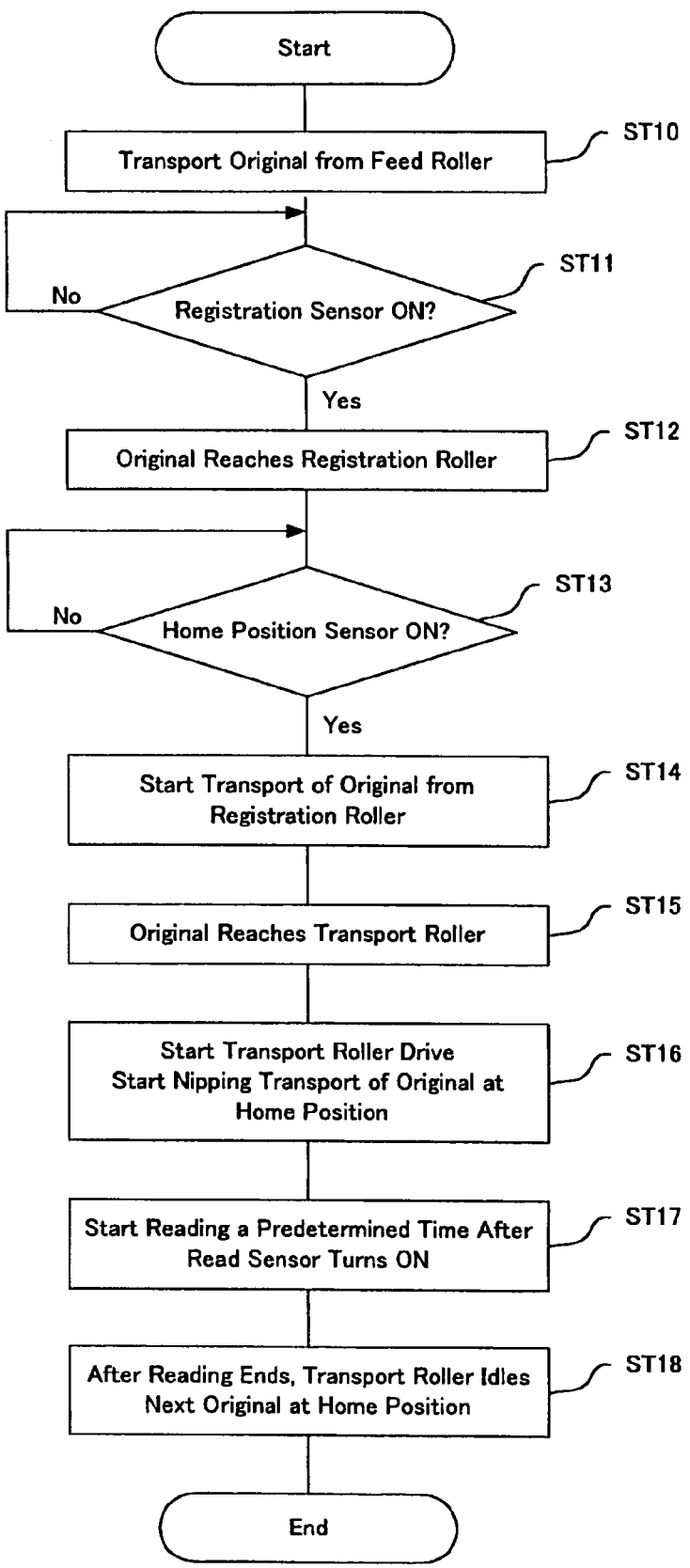
FIG. 6 is a flow chart for explaining an operation of transporting the original.
Figure 7A:
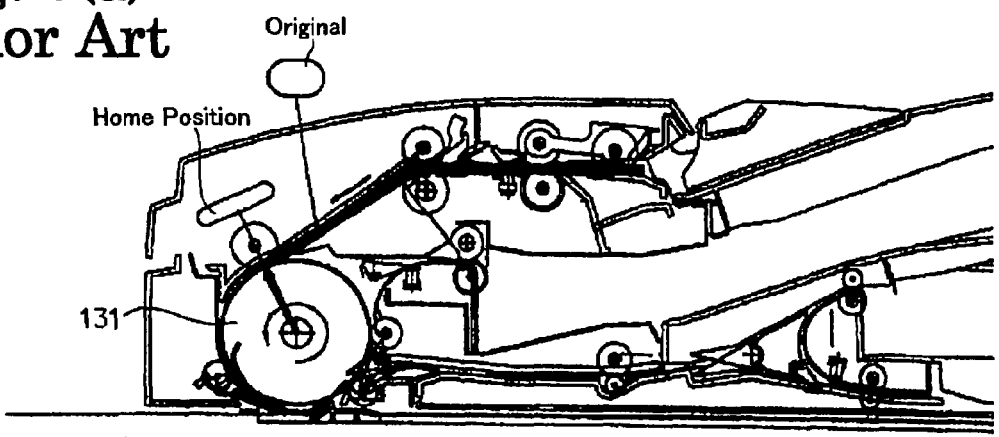
FIGS. 7(a)-7(c) are sectional views of a conventional original feeding apparatus for explaining a process of transporting the original by a transport roller.
Figure 7B:
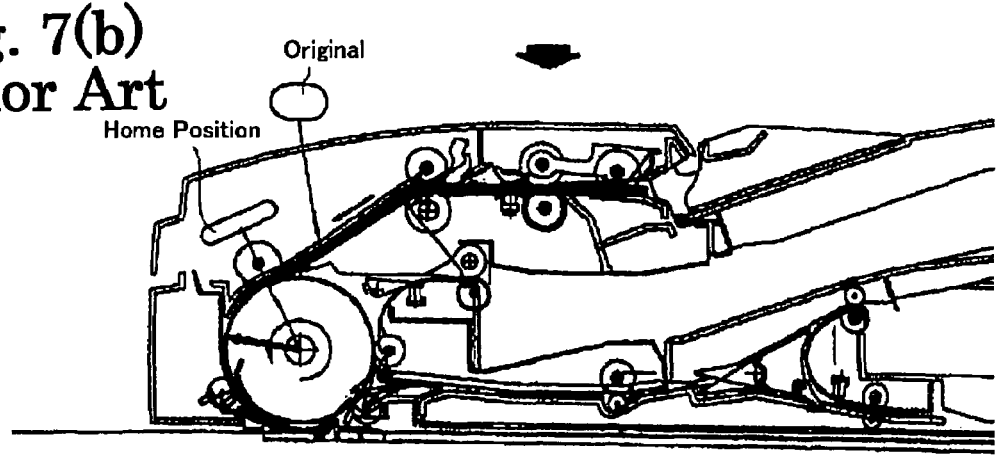
Figure 7C:
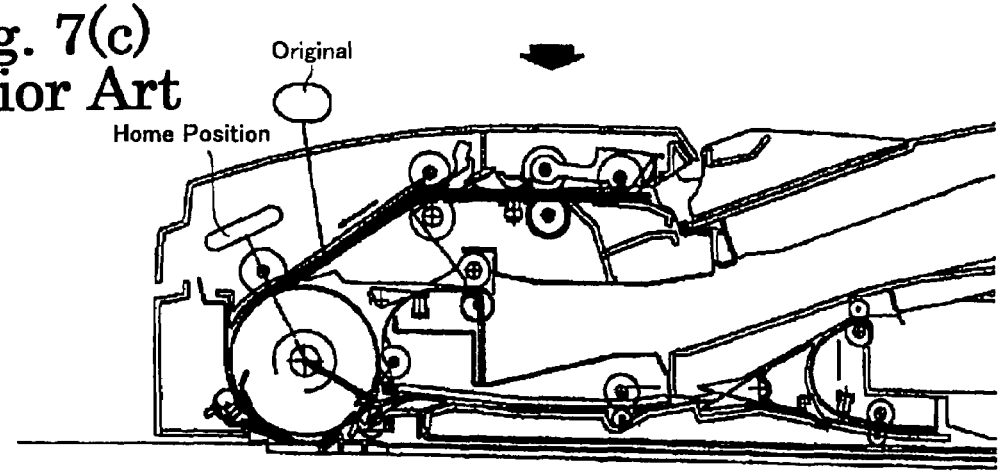

FIG. 5 is a timing chart for explaining the home position X of the transport roller 31 and the transport operation. FIG. 6 is a flow chart for explaining a process of the original transport operation in the high quality mode. A basic operation of transporting the original in the high quality mode will be explained next.

At first, the transport roller 28 transports the original (ST10), and the register sensor S4 arranged at the paper feed path 16 turns ON (ST11). The leading edge of the original is transported to the register rollers 30 (ST12). The home position sensor S10 is in an ON state, i.e. the home position X of the transport roller 31 stops at the nipping position. The transport roller 31 waits for the original to be transported from the register rollers 30 (ST13).

When the register rollers 30 start transporting the original, the transport roller 31 also starts rotating to nip the original at the home position X (indicated by the arrow in FIG. 4(a)) on the transport roller 31 (ST16). The original is transported to the transport path 17 and the read sensor S5 turns ON. After a predetermined amount of time, the reading start signal is sent to the reading means. After the original is read and passes through the reading position, the transport roller 31 waits for the next original while the home position X is located at the nipping position (ST18).

It may take time until the transport roller 31 is set at the home position X. In the ADF 1 of the embodiment, the transport roller 31 transports the original from the home position X only in the high quality mode. In the non-high quality mode, the original is transported in the normal way without waiting, i.e. the original is transported from the arbitrary position, not from the constant position. The transport roller 31 may have an outer circumference suitable for the original to be processed in a large quantity.

An operation of transporting the original in the ADF 1 will be explained next with reference to FIG. 1 to FIG. 4(c). First, a single-side reading mode for reading one side of the original will be explained. When the empty sensor S3 is in an ON state, i.e. the original is on the original tray 9 and the paper feed signal from the reading device 2 is received, the feed motor M1 rotates forward to feed the original. At this time, the feed roller 26 and the transport roller 28 rotate in the transport direction, and the register rollers 30 do not rotate due to the one-way clutch OW2. When the register sensor S4 detects the leading edge of the original, the feed motor M1 transports the original for a predetermined amount and stops. At this time, the leading edge of the original abuts against the nipping position of the register rollers 30, and the original is bent for aligning the leading edge of the original and removing skew thereof. After the original is stopped, the feed motor M1 rotates in reverse to feed the original from the paper feed path 16 to the transport path 17.

When the feed motor M1 rotates in reverse, the transport motor M2 is driven to transport the original in the transport path 17 along the transport roller 31. At this time, the transport roller 31 and the follower roller 32 nip the original at the home position of the transport roller 31. Then, the transport roller 31 transports the original to the transport path 17.

When the read sensor S5 detects the leading edge of the original transported through the transport path 17, the feed motor M1 and the transport motor M2 transport the original for a predetermined amount, and stop. At this time, the original stops at a position in front of the platen 3. The transport motor M2 drives again when the read signal is received from the reading device 2 to pass the original over the first platen 3, so that the reading means reads the image on the original.

In the single-side reading mode for reading the image on one side of the original, when the register sensor S4 detects the trailing edge of the original while the original passes through the transport path 17, it is determined whether the next original is on the original tray 9. When there is the next original on the original tray 9, it is controlled to start transporting the next original in the way same as that for the previous original. At this time, the transport roller rotates to the home position.

Next, the duplex reading mode for reading the images on both sides of the original will be explained. The feed roller 26 and the transport roller 28 rotate to feed the original, so that the leading edge of the original abuts against the register rollers 30 to eliminate skew thereof. Then, the register rollers 30 and transport roller 31 rotate to send the original from the paper feed path 16 to the transport path 17. After the read sensor S5 detects the leading edge of the original, the original is transported for a predetermined amount, and stops at a predetermined position in front of the platen 3.

The original is transported from the original tray 9 to the position in front of the first platen 3 in the way same as that for the single-side reading mode described above.

In the duplex reading mode, the switchback solenoid SOL1 is activated to move the switchback flapper 42 to a position for guiding the original into the switchback path 22. When the reading transport signal is received from the reading device 2, the transport motor M2 rotates again and the discharge motor (not shown) rotates forward. Accordingly, the original passes over the first platen 3 for reading by the reading means, and the original is then guided into the switchback path 22.

The original guided into the switchback path 22 is transported through the switchback path 22 while being nipped by the switchback rollers 40. When the switchback sensor S6 detects the trailing edge of the original, the discharge motor and the transport motor M2 are stopped while the pair of the switchback rollers 40 nips the trailing edge of the original. Then, the discharge motor rotates in reverse to rotate the pair of the switchback rollers 40 in reverse to switchback the original and guide the original into the circulating path 19.

When the original switched back by the switchback rollers 40 is transported for a predetermined distance, the leading edge of the original abuts against the nip of the follower roller 36 and the transport roller 31, so that the original is aligned to remove skew thereof. The transport motor M2 drives again to rotate the transport roller 31 to transport the original. When the original is transported along the transport roller 31 and the leading edge thereof reaches the nipping position of the transport roller 31 and the follower roller 32, the transport roller 31 stops temporarily. When the transport roller 31 is not located at the home position X, the follower roller 36 separates from the transport roller 31, and the transport roller 31 rotates to the home position X.

When the transport roller 31 is positioned at the home position X, the transport motor M2 stops. After the follower roller 36 is pressed against the transport roller 31, the transport motor M2 starts to drive again to rotate the transport roller 31 and start transporting the original into the transport path 17. When the read sensor S5 detects the leading edge of the original, the transport motor M2 stops after a predetermined amount of time. As a result, the original fed from the switchback path 22 is returned to the transport path 17 via the circulating path 19.

After the image on the other side of the original is read, the original is transported to the switchback path 22 again. Then, the switchback flapper 42 is activated to move the first flapper 42 to a position for guiding the original into the intermediate path 21, so that the original is guided from the intermediate path 21 into the switchback path 22. After the original is switched back in the switchback path 22 and is turned over, the pair of the discharge rollers 37 discharges the original to the discharge tray 11 via the discharge path 18.

In the embodiment, the follower roller 32 is disposed around the large roller 31 as shown in FIG. 2. Alternatively, it is possible to provide a drive roller facing each follower roller for driving the follower roller in common, or it is possible to nip the original at a common starting position.

As described in detail above, according to the present invention, the original feeding apparatus and the image reading apparatus include the sheet feeding tray for stacking the original; the feeding means for feeding the original stacked on the sheet feeding tray one at a time; the transport roller for receiving the original from the feeding means at the predetermined nipping position and transporting the original while the outer surface of the roller contacts the original; the drive means for driving the transport roller; and the detection means for detecting that the predetermined position on the outer surface of the transport roller matches the nipping position. In the original feeding apparatus and the image reading apparatus, the transport roller is controlled such that the transport roller receives the leading edge of the original fed from the feeding means at the predetermined position, i.e. the original transport starting position.

Accordingly, it is possible to reduce variation in the original transport performance when a plurality of the originals is read continuously. In the present invention, the original transport starting position is located at a constant position on the outer surface of the roller, so that the original is transported stably, thereby obtaining stable image quality without using a part with high precision.

While the invention has been explained with reference to the specific embodiments of the invention, the explanation is illustrative and the invention is limited only by the appended claims.

What is claimed is:

1. An original feeding apparatus for feeding an original, comprising:
   a sheet feeding tray for stacking the original,
   feeding means disposed adjacent to the sheet feeding tray for feeding the original stacked on the sheet feeding tray one at a time,
   a transport roller disposed adjacent to the feeding means for receiving the original from the feeding means at a nipping position thereof and for transporting the original along an outer surface thereof,
   drive means connected to the transport roller for rotating the transport roller,
   a home position display member for indicating a position of the transport roller, said home position display member rotating in synchronous with rotation of the transport roller,
   detection means for detecting the home position display member, said detection means judging if a predetermined fixed position on the transport roller matches the nipping position, and
   control means electrically connected to the drive means and the detection means, said control means controlling the transport roller to be able to receive a leading end of the original transported from the feeding means at the fixed position where a transport operation by the transport roller is started.

2. An original feeding apparatus according to claim 1, wherein said transport roller includes the home position display member, which is disposed at an inner side of the transport roller for indicating the position of the transport roller so that the detection means detects the positioning member to find the position of the transport roller.

3. An original feeding apparatus according to claim 1, wherein said drive means rotates the transport roller at a reading speed when the original is read, and rotates the transport roller at a speed greater than the reading speed when the fixed position on the transport roller is sent to the nipping position.

4. An original feeding apparatus for feeding an original, comprising:
   a sheet feeding tray for stacking the original,
   feeding means disposed adjacent to the sheet feeding tray for feeding the original stacked on the sheet feeding tray one at a time,
   a transport roller disposed adjacent to the feeding means for receiving the original from the feeding means at a nipping position thereof and for transporting the original along an outer surface thereof,
   drive means connected to the transport roller for rotating the transport roller, detection means for detecting that a predetermined fixed position on the transport roller matches the nipping position,
   control means electrically connected to the drive means and the detection means for controlling the transport roller to be able to receive the original at the fixed position, and
   selection means for selecting a high quality mode or a non-high quality mode so that the control means controls the transport roller to receive the original at the fixed position only in the high quality mode and to receive the original at any position around the roller in the non-high quality mode.

5. An original feeding apparatus according to claim 4, wherein said selection means selects the high quality mode when the original has a color image, and selects the non-high quality mode when the original has a black and white image.

6. An original feeding apparatus according to claim 4, wherein said drive means rotates the transport roller at a first speed in the non-high quality mode and rotates the transport roller at a second speed in the high quality mode, said first speed being greater than said second speed.

7. An original reading apparatus comprising
   an original feeding apparatus for feeding an original, comprising: a sheet feeding tray for stacking the original, feeding means disposed adjacent to the sheet feeding tray for feeding the original stacked on the sheet feeding tray one at a time, a transport roller disposed adjacent to the feeding means for receiving the original from the feeding means at a nipping position thereof and for transporting the original along an outer surface thereof, drive means connected to the transport roller for rotating the transport roller, detection means for detecting that a predetermined fixed position on the transport roller matches the nipping position, and control means electrically connected to the drive means and the detection means for controlling the transport roller to be able to receive the original at the fixed position,
   reading means for reading an image on the original transferred by the transfer roller, and
   selection means for selecting a high quality mode or a non-high quality mode in reading the image on the original, said control means controlling the transport roller to receive the original at the fixed position in the nipping position when the selection means selects the high quality mode.

8. An original reading apparatus according to claim 7, wherein said selection means is an image selection switch capable of being operated manually.

9. An original reading apparatus according to claim 7, wherein said transport roller includes a positioning member disposed at an inner side of the transport roller for indicating a position of the transport roller so that the detection means detects the positioning member to find a position of the transport roller.

10. An original reading apparatus according to claim 7, wherein said drive means rotates the transport roller at a first speed in the non-high quality mode and rotates the transport roller at a second speed in the high quality mode, said first speed being greater than said second speed.

11. An original reading apparatus according to claim 7, wherein said drive means rotates the transport roller at a reading speed when the original is read, and rotates the transport roller at a speed greater than the reading speed when the fixed position on the transport roller is sent to the nipping position.

* * * * *